(12) United States Patent
Reiser et al.

(10) Patent No.: US 6,277,508 B1
(45) Date of Patent: Aug. 21, 2001

(54) FUEL CELL POWER SUPPLY WITH EXHAUST RECYCLING FOR IMPROVED WATER MANAGEMENT

(75) Inventors: Carl Anthony Reiser, Stongington; Deliang Yang, Vernon; Paul Richard Margiott, South Windsor, all of CT (US)

(73) Assignee: International Fuel Cells Corporation, South Windsor, CT (US)

( * ) Notice: Subject to any disclaimer, the term of this patent is extended or adjusted under 35 U.S.C. 154(b) by 0 days.

(21) Appl. No.: 09/118,546

(22) Filed: Jul. 17, 1998

(51) Int. Cl.$^7$ .................................................. H01M 8/04
(52) U.S. Cl. .................. 429/17; 429/34; 429/13; 422/182
(58) Field of Search ................. 429/17, 14, 13, 429/19, 34; 422/182, 168

(56) References Cited

U.S. PATENT DOCUMENTS

| | | | |
|---|---|---|---|
| 4,826,741 | * | 5/1989 | Aldhart et al. .................. 429/19 |
| 5,134,043 | * | 7/1992 | Nakazawa ......................... 429/16 |
| 5,441,821 | * | 8/1995 | Merritt et al. .................... 429/17 |
| 5,635,039 | * | 6/1997 | Cisar et al. ..................... 204/252 |
| 5,753,383 | * | 5/1998 | Cargnelli et al. ................ 429/13 |
| 5,853,909 | * | 12/1998 | Reiser ............................ 429/13 |
| 5,976,722 | * | 11/1999 | Muller et al. ................... 429/13 |
| 5,989,739 | * | 11/1999 | Zur Megede et al. ............. 429/13 |
| 5,993,984 | * | 12/1999 | Matsumura et al. .............. 429/17 |
| 6,007,931 | * | 12/1999 | Fuller et al. .................... 429/13 |
| 6,017,646 | * | 1/2000 | Prasad et al. ................... 429/13 |

* cited by examiner

*Primary Examiner*—John S. Maples
*Assistant Examiner*—R Alejandro
(74) *Attorney, Agent, or Firm*—McCormick, Paulding & Huber LLP

(57) ABSTRACT

Methods and apparatus for improving water management in a PEM fuel cell power supply are disclosed. The fuel cell power supply includes a combustion unit that combusts anode exhaust, producing combusted exhaust that includes water. The combusted exhaust is recycled to the anode input and/or the cathode input. The recycling system can include additional devices, for example, a CO removal device for removing CO from the combusted exhaust prior to recycling to the anode. A fuel processor can be thermally coupled to the combustion unit that combusts the anode exhaust. One advantage of the invention is that the condenser typically employed for recovering water from combusted exhaust can be eliminated, of reduced capacity or operated less frequently, thereby reducing the cost and/or the complexity of the fuel cell power supply.

17 Claims, 3 Drawing Sheets

FUEL CELL POWER SUPPLY WITH EXHAUST RECYCLING FOR IMPROVED WATER MANAGEMENT

FIELD OF THE INVENTION

This invention relates to fuel cell power supplies and more particularly to methods and apparatus for improved water management in fuel cell power supplies.

BACKGROUND

Many types of fuel cells are known in the art, such as solid oxide fuel cells, molten carbonate fuel cells, phosphoric acid fuel cells and proton exchange membrane (PEM) fuel cells. Conceptually, the operation of a fuel cell is very simple. An electrolytic medium separates an anode and a cathode, between which electricity is produced when a fuel is introduced to the anode, an oxidizer is introduced to the cathode, and the cell is maintained at the proper temperature. The electrolytic medium allows an ionic species to travel between the cathode and the anode. The reaction products are relatively simple and benign, typically including carbon dioxide and water, thus minimizing environmental concerns. In contrast to other energy sources, such as internal combustion engines, fuel cells are simpler, less noisy, do not pollute, demonstrate high efficiencies, and create electricity directly.

In practice, however, a fuel cell power supply can be relatively complex, as considerable hardware can be required to support the fuel cells, which are typically arranged in an cell stack assembly (CSA). Such hardware can include a thermal management subsystem for maintaining the CSA at the proper operating temperature, a fuel processing subsystem that can include fuel reformers and shift converters for generating a hydrogen fuel from a hydrocarbon fuel, and a water management subsystem for recovering water generated by the operation of the fuel cell(s) to reduce the need for external water. Desulfurization of the fuel is often also required. The various subsystems are often interrelated, for example including heat exchangers, blowdown coolers or condensers for transferring heat and/or water from one subsystem to another.

Water management is particularly important in a Proton Exchange Membrane (PEM) fuel cell power supply. Water generated at the cathode should be removed to avoid flooding the cathode and preventing the oxidant from reacting at the cathode. Furthermore, water is dragged through the membrane by $H^+$ protons to the cathode, drying out the anode and adding to the water that must be removed from the cathode. Such drying of the anode, or even drying of the cathode due to improper water management, can damage the proton exchange membrane. Accordingly, water is typically added to the fuel input of the anode, and removed from the cathode in controlled manner by exhausting of the cathode external to the system. Other subsystems, such as a fuel reformer, can require water. It is desirable that water use and generation be balanced such that the power supply be self-sufficient and does not require water from an external source. Water balance concerns thus add complexity to PEM fuel cell power supplies.

To date, fuel cells power supplies, such as those based on PEM cells, have not found widespread use, such that their environmental and other benefits can be fully realized, in part because of the complexity and associated cost of existing fuel cell power supplies. Such a situation is far from satisfactory, as environmental and other concerns with the drawbacks of traditional power sources (such as internal combustion engines and coal or oil fired electrical power generation plants) are unlikely to become less pressing.

Accordingly it is an object of the invention to reduce the complexity and/or the cost of fuel cell power supplies.

It is another object of the invention to provide methods and apparatus for improving water management in a PEM fuel cell power supply.

Other objects of the invention will in part be apparent and in part appear hereinafter.

SUMMARY OF THE INVENTION

The present invention achieves these and other objects by providing methods and apparatus for recycling anode exhaust from the anode flow field of a fuel cell power supply. Anode exhaust is provided to a combustion unit, and the combustion exhaust routed to at least one of the cathode flow field and the anode flow field of the supply.

According to one aspect of the invention, a fuel cell power supply for producing electricity from input fuel and oxidizer reactants includes a cell stack assembly (CSA). The CSA includes at least one fuel cell having an anode, a cathode, and an electrolytic medium therebetween. The CSA is adapted for defining an anode flow field for receiving and exposing the anode to the fuel and a cathode flow field for receiving and exposing the cathode to the oxidizer. The CSA is also adapted for providing an exhaust from the anode flow field. The power supply includes a removal means for removing water from the cathode flow field. A combustion unit receives exhaust from the anode flow field to produce a combusted exhaust including water, and the combustion unit fluidly communicates the combusted exhaust to the cathode flow field and/or the anode flow field. The combustion unit can be thermally coupled to a fuel processor for processing the input fuel. Optionally, cathode exhaust from the cathode flow field may also be provided to the combustion unit.

According to another aspect of the invention, a fuel cell power supply for producing electricity from fuel and oxidizer reactants includes a cell stack assembly (CSA) including at least one fuel cell having an anode, a cathode, and an proton exchange membrane (PEM) therebetween. The CSA is adapted for defining an anode flow field for receiving the fuel for exposure to the anode, for providing an exhaust from the anode flow field, and for defining a cathode flow field for receiving oxidizer for exposure to the cathode. The CSA is also adapted for defining a coolant flow field for cooling the CSA and for recovering water internal to the CSA. The power supply also includes a combustion unit for receiving exhaust from the anode flow field to produce a combusted exhaust including water. The combustion unit fluidly communicates with the anode flow field for providing at least a portion of the combusted exhaust to the anode flow field. Alternatively, the combustion unit can be in fluid communication with the cathode flow field for providing at least a portion of the combusted exhaust to the cathode flow field. Optionally, cathode exhaust from the cathode flow field may also be provided to the combustion unit.

In yet a further aspect, the invention provides a method of operating a fuel cell power supply to produce electricity from input fuel and oxidizer reactants where the fuel cell power supply includes a cell stack assembly (CSA) including at least one fuel cell having an anode, a cathode, and an electrolytic medium therebetween. The method includes providing an anode flow field for exposing the anode to the fuel; providing a cathode flow field for exposing the cathode to the oxidizer; delivering at least at portion of anode exhaust from the anode flow field to a combustion unit;

combusting the anode exhaust to produce combusted exhaust including water; providing the combusted exhaust to at least one of the anode flow field and the cathode flow field; and removing water from the cathode flow field for use in the fuel cell power supply. Water can be removed from the cathode flow field via internal water recovery. Furthermore, the method can include providing cathode exhaust from the cathode flow field to the combustion unit.

One advantage of the invention is that the condenser typically employed for recovering water from combusted exhaust can be eliminated, of reduced capacity, or operated less frequently, thereby reducing the cost and/or the complexity of the fuel cell power supply or of the operation thereof.

These and other features of the invention are more fully set forth with reference to the following detailed description, and the accompanying drawings.

DETAILED DESCRIPTION OF THE PREFERRED EMBODIMENTS

Figure 1:
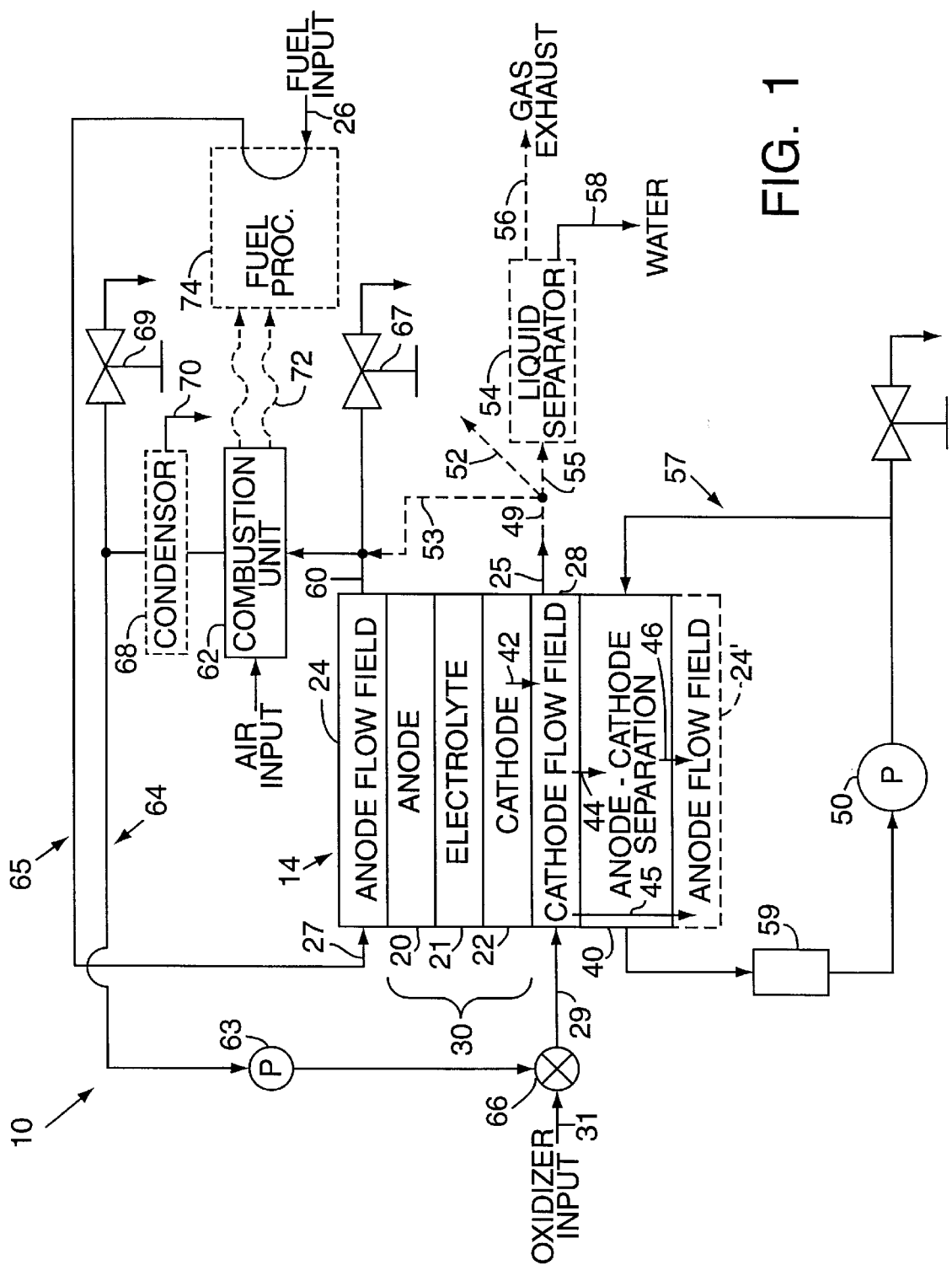
FIG. 1 is a schematic diagram of a fuel cell power supply according to the present invention in which exhaust from the anode flow field is combusted and the combusted exhaust is directed to the cathode flow field.

With reference to FIG. 1, reference numeral 10 schematically illustrates a fuel cell power supply 10 according to the invention. The power supply includes a cell stack assembly (CSA) 14 that includes a fuel cell 30.

The fuel cell 30 includes an electrolytic medium 21, such as proton exchange membrane (PEM), that is interposed between an anode 20 and a cathode 22. As is understood by one of ordinary skill in the art, the fuel cell 30 can include other layers omitted for simplicity from FIG. 1, such as a substrate layers and bi-layers adjacent the cathode and anode. As also understood, the CSA 14 is adapted for defining an anode flow field 24 for receiving fuel from the anode flow field input 27 and exposing the anode 20 to the fuel. Similarly, the CSA 14 is adapted for defining a cathode flow field 28 receiving an oxidizer (e.g. oxygen) at the cathode flow field input 29 from the oxidizer input stream 31 and exposing the cathode 22 to the oxidizer. The anode and cathode flow fields are indicated schematically, for, as understood by one of ordinary skill in the art, the CSA can be adapted in a number of ways to define the flow fields 24 and 28. Typically, the CSA includes plates having channels or grooves in a side facing fuel cell 30 direct a flux of fuel and oxidizer reactants appropriately.

In operation of the CSA 14, the anode flow field 24 receives the fuel (e.g. hydrogen) at the input 27 from a fuel input 26. Prior to delivery to the anode flow field 24, the fuel can be processed by an optional fuel processor 74, as is further discussed below. The fuel is reduced at the anode 20, liberating electrons and $H^+$ ions. The $H^+$ ions travel through the electrolytic medium 21 to the cathode 22, where they unite with the oxidizer (e.g. oxygen) to form water that enters the cathode flow field 28, as indicated by reference numeral 42. The process is typically exothermic. The anode 20 and cathode 22 develop a potential therebetween, and a load connected across the anode 20 and cathode 22 completes an external circuit, providing a return path for electrons generated at the anode 20.

The water content of the cathode flow field must be properly managed to avoid flooding that can prevent oxygen from reaching the cathode 22. A cathode flow field exhaust 49 can allow removal of the water 25 via the exhaust. The cathode exhaust can be simply vented external to the fuel cell power supply, as indicated by reference numeral 52, or can be routed to a liquid separator that separates the water 25 and from the cathode exhaust and provides gas and water outlets, 56 and 58, respectively. The water 25 can then be directed for use by the power supply 10. Such use can include, but is not limited to, combining the water with the fuel input stream 26 for humidifying the anode flow field, directing the water 25 to a steam reformer for converting a hydrocarbon fuel to hydrogen, directing the water 25 to a shift converter for converting carbon monoxide to hydrogen, or directing the water 25 to a cooling system associated with the fuel cell power supply. For example, another technique, known as internal water recovery, is described below. As understood by one of ordinary skill in the art, water can be used in a fuel cell power supply in a number of ways, such as with one of more of the subsystems that can be associated with the fuel cell power supply.

The fuel cell 30 is described herein as representative; typically, the CSA 14 contains a plurality of fuel cells, such as fuel cell 30, stacked atop one another, as partially indicated by the depiction of another anode flow field 24' below the cathode flow field 28. The electrical outputs of the various anodes and cathodes of the plurality of fuel cells are combined. To provide alternating current, the power supply can include an inverter for converting the direct current output of the CSA 14 to alternating current.

As used herein, the term "CSA" refers to an assembly that includes a fuel cell having an anode, a cathode and an electrolytic medium therebetween and that includes structure for providing at least cathode and anode flow fields for exposing the cathode and anode of the fuel cell to input reactants, such as an oxidizer and fuel. The CSA need not have the particular form illustrated in FIG. 1.

Block 40 schematically indicates an important function performed in a CSA 14 that includes a plurality of fuel cells. Adjacent cathode and anode flow fields, such as cathode flow field 28 and anode flow field 24', are separated to prevent commingling of oxidizer and fuel reactants. Structurally, the CSA 14 can be adapted in a variety of ways to accomplish separation of the cathode flow field 28 from the anode 24' indicated by block 40. For example, as disclosed in U.S. Pat. No. 4,769,297, issued Sep. 6, 1988 to Reiser et al., herein incorporated by reference, the CSA 14 can include a hydrophilic separator plate (not shown in FIG. 1) between the cathode flow field 28 and the anode flow field 24'. The separator plate, in conjunction with an appropriate pressure differential maintained between the cathode flow field 28 and the anode flow field 24', prevents the aforementioned commingling of the oxidizer and fuel. However, the separator plate also allows water to be removed from the cathode flow field by passing the water directly from the cathode flow field 28 to the anode flow field 24', as indicated by reference numeral 45, for use thereof by the power supply 10, such as by humidifying the anode flow field 24'.

In another approach, the anode-cathode separation indicated by block 40 can be accomplished by structure that also defines a coolant flow field, as disclosed in U.S. Pat. No. 5,503,944, issued to Meyer et al. on Apr. 2, 1996, and herein incorporated by reference. Disclosed in the '944 patent are porous plates that define the cathode and anode flow fields, 28 and 24', respectively, and that also define a coolant flow field between the plates and hence between the anode and cathode flow fields. A pump 50 forces the coolant, typically water, through cooling loop 57 that can include heat exchange element 59 for radiating heat from the loop. The porous plates allow water removal from the cathode flow field 28 and use of the water by the power supply 10. Water travels from the cathode flow field 28 to the coolant flow field, as indicated by reference numeral 44, where it can be circulated in the coolant loop 57. Water can also travel from the coolant flow field to and from the anode flow field 46, for preventing drying out of the electrolyte membrane 21. Water flow can be directed by maintaining pressure differentials between the various flow fields.

The term "internal water recovery", as used herein, refers to removal of water, internal to the CSA 14, from the cathode flow field 28 and/or the anode flow field 24 and its return to the a coolant flow field, such as by the techniques and structure just described above.

However, as described above, water can be removed from cathode flow field 28 externally for return to the power supply 10; the liquid separator 54 incorporated in the exhaust 56 can be used in conjunction with, or instead of, the internal water recovery just described. As understood by one of ordinary skill excess water can be discarded. Water, as used herein, can refer to water in the liquid or vapor state.

The fuel cell power supply 10 of the present invention includes a recycling loop 64 for improved water management. A combustion unit 62, which can be, for example a burner or a catalytic bed, fluidly communicates with the anode flow field 24, receiving anode exhaust 60 from an exhaust of the anode flow field 24. The anode exhaust typically includes unused hydrogen. The combustion unit 62 combusts the exhaust 60 to produce a combusted exhaust that includes water. Via the recycling loop 64, the combustion unit 62 fluidly communicates with the cathode flow field 28, providing combusted exhaust to the cathode flow field input 29. Water in the combusted exhaust is thus provided for use to the power supply 10 via the internal recovery processes (such as described in the '297 and 944' patents) or an external recovery process (e.g. the liquid/gas separator 54). At least one of the valves 67 and 69 can be included for venting anode exhaust and combusted exhaust, respectively, from the recycling loop 64. A mixing valve 66 can also be included, and a pump can 63 boost the pressure, if necessary, of the combusted exhaust. As indicated in FIG. 1, the combustion unit also receives air.

One or all of the valves 66, 67 and 69 can be operated to vary the ratio in which combusted exhaust and oxidizer are directed to the cathode flow field 28.

Figure 2:
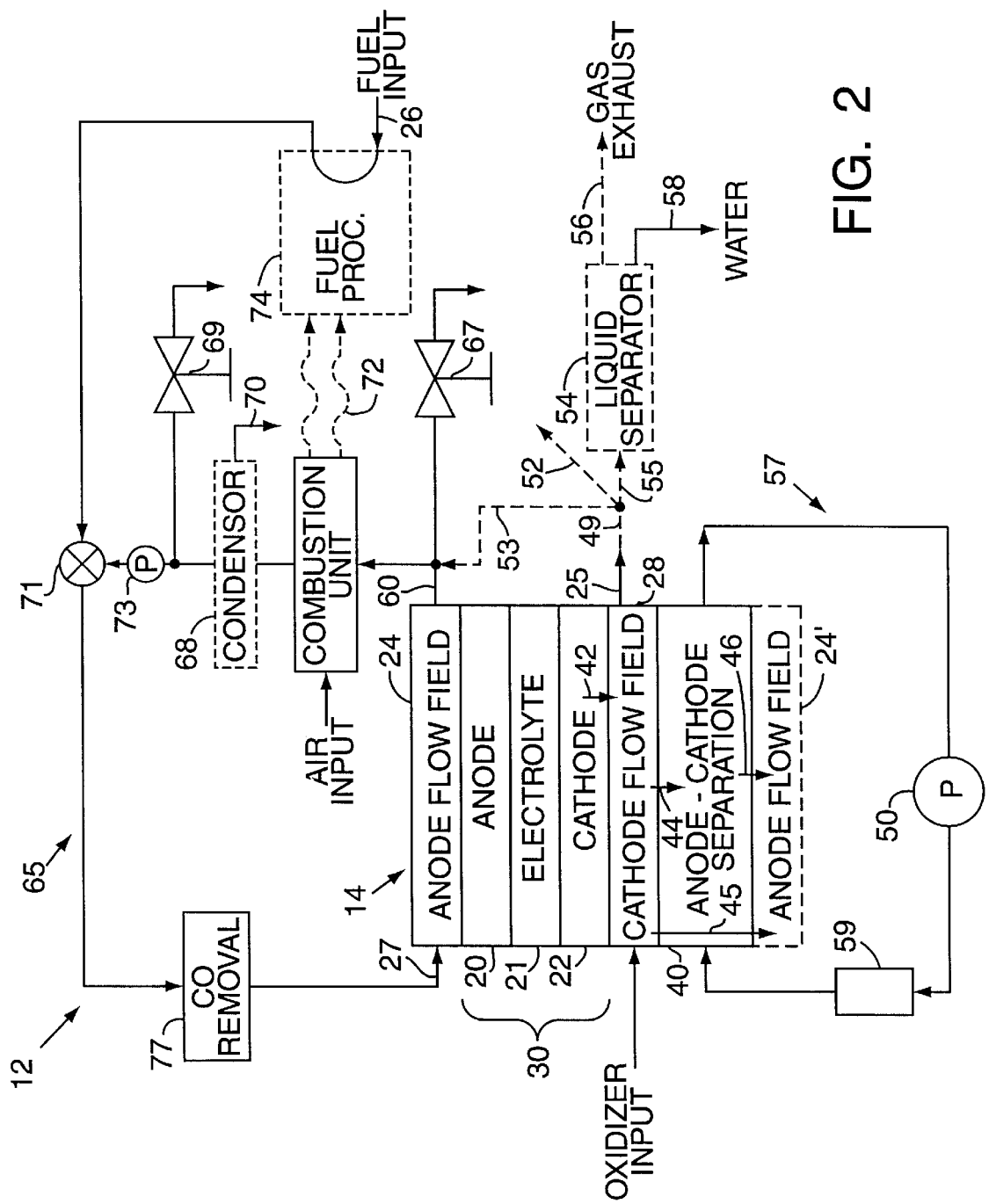
FIG. 2 is a schematic diagram of a fuel cell power supply according to the present invention in which exhaust from the anode flow field is combusted and the combusted exhaust is directed to the anode flow field.

FIG. 2 illustrates a fuel cell power supply 12 including a loop 65 for recycling of the combusted exhaust from the combustion unit 62 to the anode flow field for humidifying the input fuel stream 26. Humidification prevents damaging drying of the electrolyte 21. $H^+$ protons drag water from the humidified anode flow field 24 across the electrolyte 21 to the cathode flow field 28, where the water can be removed for use by the power supply 12 as described above.

As shown in FIG. 2, the power supply can include a CO removal device 77 for removing CO from the input fuel stream. One such CO removal device is disclosed in U.S. Pat. No. 5,330,727, herein incorporated by reference. In the embodiment shown in FIG. 2, the combustion unit 62 is preferably operated as near to stoichiometric as possible to reduce the amount of oxygen introduced into the input fuel stream 26 and hence into the anode flow field 24. The condenser 68 can be included as illustrated for removing water from the combusted exhaust. Exhaust valves 67 and 69 provide the option of venting at least a portion of the anode exhaust or the combusted exhaust. A mixing valve 71 can also be included as shown. As the input fuel stream 26 is typically at an elevated pressure, a pump 73 can be included for raising the pressure of the combusted exhaust. FIG. 2 shares many features in common with FIG. 1. These features are not discussed in conjunction with FIG. 2.

One or all of the valves 66, 67 and 71 can be included for varying the ratio in which combusted exhaust and fuel and directed to the anode flow field 24.

Figure 3:
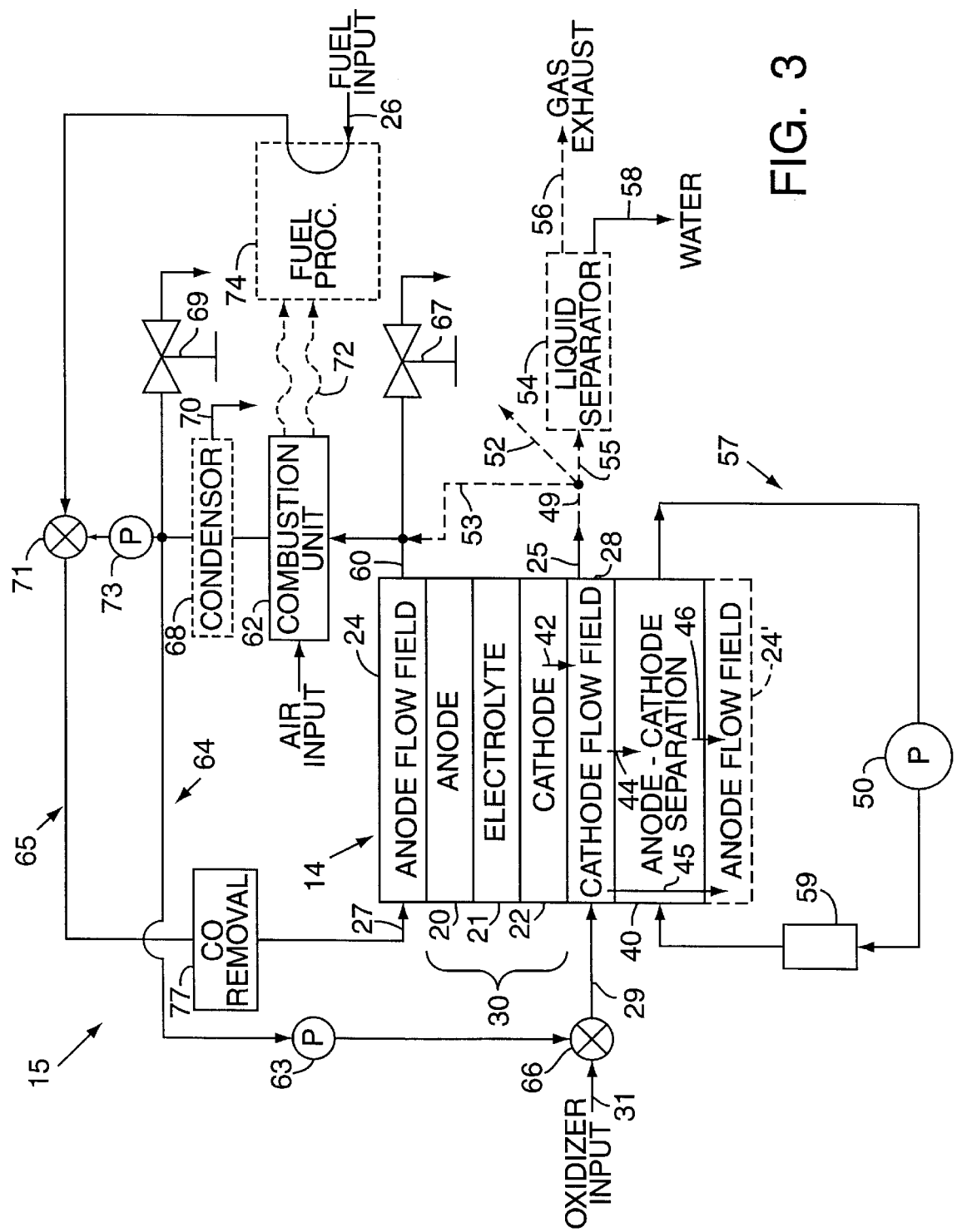
FIG. 3 is a schematic representation of a fuel cell power supply according to the present invention in which exhaust from the anode flow field is combusted and can be selectively directed to the anode flow field, the cathode flow field, or to both flow fields.

FIG. 3 schematically illustrates a fuel cell power supply 15 according to the invention wherein the combusted exhaust from the combustion unit 62 can be directed to the anode flow field 24 or to the cathode flow field 28, or to both flow fields. One or more of the valves 63, 67, 69, and 71 can be adjusted to vary the amount the combusted exhaust directed to the cathode flow field relative to the anode flow field, and to vary the ratios of combusted exhaust to fuel and oxidizer. Other features in common with FIGS. 1 and 2 are illustrated in FIG. 3.

With reference to FIGS. 1–3, according to the invention, the combustion unit 62 can also receive cathode exhaust, as indicated by reference numeral 53, such that the water 25 present therein is provided via the burner exhaust to one of the cathode flow field 22, the anode flow field 24, or both of the flow fields, as illustrated in FIGS. 1–3. Water 25 present in the cathode exhaust is thus retained for use by the fuel cell power supply 10, 12 or 15.

Prior fuel cell power supplies combust anode exhaust to consume unused hydrogen and route the combusted exhaust to a condenser for recovering water, which can then directed to the power supply for use thereby. According to the invention, the combusted exhaust is recycled to the anode or cathode flow fields and such a condenser can be eliminated, or if included, (e.g. optional condenser 68 illustrated in FIGS. 1–3) can be of reduced capacity or operated less frequently. The complexity and/or the cost of the PEM supply is thus reduced. If the optional condenser 68 is present, water can be removed from the condenser 68, as indicated by reference numeral 70.

As illustrated in FIGS. 1–3, the combustion unit can thermally communicate with an optional fuel processor 74, as indicated by the wavy lines 72.

It is thus seen that the invention efficiently attains the objects set forth above, among those made apparent from the preceding description. Because certain changes may be made in the above constructions without departing from the scope of the invention, it is intended that all matter presented in the above description or shown in the accompanying drawings be interpreted as illustrative and not as limiting.

It is also understood that the following claims are to cover a generic and specific features of the invention described herein and all statements of the invention, which, as a matter of language, might be said to fall therebetween.

Having described the invention, what is claimed as new and desired to be secured by Letters Patent is:

1. A fuel cell power supply for producing electricity from fuel and oxidizer reactants, comprising a cell stack assembly including at least one fuel cell having an anode, a cathode, and a solid electrolytic medium therebetween, said cell stack assembly adapted for defining a solid anode flow field for receiving a fuel for exposing said anode thereto, for providing an exhaust to said anode flow field, and for defining a cathode flow field for receiving and exposing said cathode to an oxidizer;

water removal means for removing water from said cathode flow field; and a combustion unit for receiving exhaust from the anode flow field to produce a combusted exhaust including water, said combustion unit in fluid communication with at least one of said anode flow field and said cathode flow field for providing at least a portion of said combusted exhaust to said at least one of said cathode flow field and said anode flow field.

2. The fuel cell power supply of claim 1 including a condenser for removing water from said combusted exhaust.

3. The fuel cell power supply of claim 1 including a fuel processor, and wherein said combustion unit is thermally coupled to said fuel processor for supplying heat thereto.

4. The fuel cell power supply of claim 1 wherein said portion of said combusted anode exhaust is provided to said anode flow field and wherein said power supply includes a pump for increasing the pressure of combusted exhaust prior to delivery thereof to said anode flow field.

5. The fuel cell power supply of claim 1 including a CO removal device for removing carbon monoxide from said combusted exhaust prior to delivery thereof to said anode flow field.

6. The fuel cell power supply of claim 1 wherein said water removal means includes a liquid/gas separator for receiving and removing water from an exhaust of said cathode flow field.

7. The fuel cell power supply of claim 1 wherein said water removal means includes a hydrophilic separator plate for allowing the transfer of water from said cathode flow field to said anode flow field.

8. The fuel cell power supply of claim 1 wherein said water removal means includes means for providing water recovery internal to said cell stack assembly.

9. The fuel cell power supply of claim 1 wherein said cell stack assembly includes first and second plates defining a water coolant flow field therebetween, said first plate further defining said anode flow field and said second plate defining said cathode flow field, and wherein said means for water removal includes pores in at least said second plate for allowing water to travel from said cathode flow field to said cooling flow field.

10. The fuel cell power supply of claim 1 including an exhaust element for exhausting said portion of said combusted exhaust such that it is not directed to said anode flow field.

11. The fuel cell power supply of claim 1 wherein said CSA is adapted for defining an exhaust from said cathode flow field and wherein said combustion unit is in fluid communication with said cathode flow field exhaust for receiving cathode exhaust.

12. A fuel cell power supply for producing electricity from fuel and oxidizer reactants, comprising:

a cell stack assembly including at least one fuel cell having an anode, a cathode, and a solid proton exchange medium therebetween, said cell stack assembly adapted for defining an anode flow field for receiving fuel for exposure to said anode, for providing an exhaust from said anode flow field, for defining a cathode flow field for receiving oxidizer for exposure to said cathode, and for defining a coolant flow field, said coolant flow field for cooling said cell stack assembly and for receipt of water recovered internal to said cell stack assembly;

a combustion unit for receiving anode exhaust from the anode flow field to produce a combusted exhaust including water, said combustion unit in fluid communication with said anode flow field for providing at least a portion of said combusted exhaust to said anode flow field.

13. The fuel cell power supply of claim 12 wherein said cell stack assembly is adapted for defining an exhaust from said cathode flow field and wherein said combustion unit is in fluid communication with said cathode flow field exhaust for receiving cathode exhaust.

14. A fuel cell power supply for producing electricity from fuel and oxidizer reactants, comprising:

a cell stack assembly including at least one fuel cell having an anode, a cathode, and a solid proton exchange medium therebetween, said cell stack assembly adapted for defining an anode flow field for receiving fuel for exposure to said anode, for providing an exhaust of received fuel from said anode flow field, for defining a cathode flow field for receiving oxidizer for exposure to said cathode, and for defining a coolant flow field, said coolant flow field for cooling said cell stack assembly and for receipt of water recovered internal to said cell stack assembly;

a combustion unit for receiving anode exhaust from the anode flow field to produce a combusted exhaust including water, said combustion unit in fluid communication with said cathode flow field for providing at least a portion of said combusted exhaust to said cathode flow field.

15. The fuel cell power supply of claim 14 wherein said cell stack assembly is adapted for defining an exhaust from said cathode flow field and wherein said combustion unit is in fluid communication with said cathode flow field exhaust for receiving cathode exhaust.

16. A method of operating a fuel cell power supply to produce electricity from input fuel and oxidizer reactants, the fuel cell power supply having a cell stack assembly including at least one fuel cell having an anode, a cathode, and an a solid electrolytic medium therebetween, the method comprising;

providing an anode flow field for exposing the anode to the fuel;

providing a cathode flow field for exposing the cathode to the oxidizer;

delivering at least at portion of anode exhaust from the anode flow field to a combustion unit;

combusting said anode exhaust with the combustion unit to produce combusted exhaust including water;

providing the combusted exhaust to at least one of the anode flow field and the cathode flow field; and removing water from the cathode flow field.

17. The method of claim 16 including the step of delivering at least a portion of cathode exhaust from the cathode flow field to the combustion unit.

* * * * *